(12) United States Patent
Tirunagari

(10) Patent No.: US 8,965,819 B2
(45) Date of Patent: Feb. 24, 2015

(54) SYSTEM AND METHOD FOR EFFECTIVE CACHING USING NEURAL NETWORKS

(75) Inventor: Durga Deep Tirunagari, Sunnyvale, CA (US)

(73) Assignee: Oracle International Corporation, Redwood City, CA (US)

( * ) Notice: Subject to any disclaimer, the term of this patent is extended or adjusted under 35 U.S.C. 154(b) by 955 days.

(21) Appl. No.: 12/857,339

(22) Filed: Aug. 16, 2010

(65) Prior Publication Data

US 2012/0041914 A1    Feb. 16, 2012

(51) Int. Cl.
| | | |
|---|---|---|
| G06E 1/00 | (2006.01) | |
| G06E 3/00 | (2006.01) | |
| G06F 15/18 | (2006.01) | |
| G06G 7/00 | (2006.01) | |
| G06N 3/02 | (2006.01) | |
| G06F 13/00 | (2006.01) | |
| G06F 13/28 | (2006.01) | |
| G06F 12/12 | (2006.01) | |

(52) U.S. Cl.
CPC .................................. *G06F 12/121* (2013.01)
USPC ........................................... 706/15; 711/113

(58) Field of Classification Search
None
See application file for complete search history.

(56) References Cited

U.S. PATENT DOCUMENTS

| | | | |
|---|---|---|---|
| 6,163,773 | A | 12/2000 | Kishi |
| 6,801,883 | B1 | 10/2004 | Hurlock |
| 6,996,676 | B2 * | 2/2006 | Megiddo et al. .............. 711/129 |
| 2002/0078300 | A1 | 6/2002 | Dharap |
| 2009/0049237 | A1 | 2/2009 | Sivakumar et al. |
| 2009/0293051 | A1 * | 11/2009 | Krywaniuk .................... 717/173 |
| 2010/0057995 | A1 | 3/2010 | Cao et al. |

OTHER PUBLICATIONS

M. Atique and M. S. Ali, "An adaptive neuro fuzzy inference system for cache replacement in multimedia operating system," 4th International Conference on Electrical and Computer Engineering (ICECE 2006), Dhaka, Bangladesh, Dec. 19-21, 2006.*

Khalid, H, "A Neural Network-Based Replacement Strategy for High Performance Computer Architectures," Microprocessing and Micropgramming, Elsevier Science Publications, Amsterdam, vol. 41, No. 10, Jun. 1, 1996, all pages.*

(Continued)

*Primary Examiner* — Kakali Chaki
*Assistant Examiner* — Daniel Pellett
(74) *Attorney, Agent, or Firm* — Robert C. Kowert; Meyertons, Hood, Kivlin, Kowert & Goetzel, P.C.

(57) ABSTRACT

Systems and methods for selecting an appropriate caching algorithm to be used when temporarily storing data accessed by an executing application using a neural network may dynamically and/or iteratively replace an initial caching algorithm being used for the application. An input layer of the neural network may gather values of performance related parameters, such as cache hit rates, data throughput rates, or memory access request response times. The neural network may detect a pattern or change in a pattern of accesses, or a change in a workload, a hardware component, or an operating system parameter. Dependent on these and/or other inputs, the neural network may select and apply a caching algorithm likely to improve performance of the application. Other inputs to the neural network may include values of hardware configuration parameters and/or operating system parameters. The neural network may perform a training exercise or may be self-training, e.g., using reinforcement learning.

20 Claims, 7 Drawing Sheets

(56) References Cited

OTHER PUBLICATIONS

Obaidat M., Khalid H. Estimating Neural Network-Based Algorithm for Adaptive Cache Replacement, IEEE Transaction on System, Man and Cybernetic, vol. 28 (1998) 602-611.*

Koskela, T., Heikkonen, J., Kaski, K.: Web Cache Optimization with Nonlinear Model using Object Feature. Computer Networks Journal 43(6) (2003).*

Kin-Yeung Wong; , "Web cache replacement policies: a pragmatic approach," Network, IEEE , vol. 20, No. 1, pp. 28-34, Jan.-Feb. 2006.*

"An Adaptive Neuro Fuzzy Inference System for Cache Replacement in Multimedia Operating System," Mohammad Atique, Dr. Mir Sadique Ali. 4th International Conference on Electrical and Computer Engineering, ICECE 2006, Dec. 19-21, 2006, Dhaka, Bangladesh.

International Search Report from PCT/US2011/047975, mailed Dec. 14, 2011, Oracle International Corporation, pp. 1-11.

Office Action from European Application No. 11746426.3, issued Jun. 27, 2014, pp. 1-8.

* cited by examiner

SYSTEM AND METHOD FOR EFFECTIVE CACHING USING NEURAL NETWORKS

BACKGROUND

Description of the Related Art

Caches are temporary storage areas where data (or a copy of data) that has been accessed or computed by an application can be stored for fast retrieval on a subsequent access. For example, when data is accessed from the main memory of a computer system, a copy of the data can be stored in a cache in case it is needed again. If the data is needed again, the copy stored in the cache (which typically has a shorter access time) can be retrieved from the cache, rather than re-fetching the data from main memory (which typically has a longer access time). Similarly, a copy of data computed by an application can be stored in a cache and then retrieved from the cache if it is needed again, rather than the data having to be re-computed or fetched from main memory where it was stored after being computed. Therefore, in applications in which the same data is frequently or repeatedly accessed or in which computed data is subsequently retrieved, caching that data can reduce the latency (i.e. response time) of memory accesses to retrieve the data and thereby improve the performance of the application.

When a cache is full, various replacement policies (also known as caching algorithms) may be used to determine which data to remove to make room for new data to be cached, depending on the policy (or policies) that are supported in the system. Some replacement policies are better suited for certain types of applications or usage patterns than others.

Artificial neural networks (generally referred to simply as "neural networks") can be used to model complex relationships between inputs and outputs (e.g., as non-linear statistical models), and can learn by example. They are typically implemented using a parallel architecture. Therefore, they exhibit fast response times, and can be well suited for use in real time systems, for some types of applications.

SUMMARY

The systems and methods described herein may use a neural network for selecting an appropriate caching algorithm to be used when temporarily storing data accessed by an executing application. The neural network may in some embodiments dynamically and/or iteratively replace an initial caching algorithm being used for the application in response to determining that the cache performance and/or overall application performance is unacceptable or has deteriorated. The neural network may include an input layer, a hidden layer (which may process inputs provided by the input layer), and an output layer.

In some embodiments, the input layer of the neural network may gather values of performance related parameters, such as cache hit rates, data throughput rates, or memory access request response times. Other inputs to the neural network may include the values of various hardware configuration parameters and/or operating system parameters. The neural network may detect a pattern of memory accesses made by the application, or a change in the pattern of accesses made by the application. In some embodiments, the neural network may detect a change in a workload of the application, a change in the frequency of memory accesses made by the application to one or more addresses, a change in a hardware component of the computer, or a change in a parameter of an operating system of the computer. In some embodiments, the neural network may determine that the value of one or more of the one or more performance parameters meets or exceeds a pre-determined threshold value, which may trigger the analysis and/or selection of a caching algorithm by the neural network.

Dependent on the inputs provided by the input layer and the current state of the application and execution environment, the hidden layer of the neural network may select a caching algorithm likely to improve performance of the application. A data value or signal output by the output layer may cause the selected algorithm to be dynamically applied (i.e. to replace an initial caching algorithm) while the application is executing. The neural network may in some embodiments select a caching algorithm dependent on a weighting of the values of the one or more performance related parameters and/or the other inputs to the hidden layer.

In some embodiments, replacing an initial caching algorithm with a caching algorithm selected by the neural network may include changing the replacement policy under which the cache operates. For example, the initial and selected caching algorithms may be different ones of: a memcached algorithm, a memcacheDB algorithm, a least recently used algorithm, a most recently used algorithm, a least frequently used algorithm, a frequency based replacement algorithm, a least $k^{th}$-to-last reference algorithm, or a least frequently recently used algorithm. In some embodiments, replacing an initial caching algorithm with a caching algorithm selected by the neural network may include changing the value of one or more parameters of the current caching algorithm, the hardware configuration (e.g., changing the size of the cache), or changing the value of a parameter of the operating system. In some embodiments, replacing an initial caching algorithm with a caching algorithm selected by the neural network may include changing the type of cache, such as if the initial and selected caching algorithms operate in conjunction with different ones of: a set-associative cache, a fully associative cache or a direct-mapped cache.

In some embodiments, if performance is not improved by replacing an initial caching algorithm by a caching algorithm selected by the neural network, the neural network may iteratively select and apply one or more other caching algorithms in an attempt to improve performance. In some embodiments, the initial caching algorithm may also be selected by the neural network. For example, the selection of an initial caching algorithm may be dependent on a predicted pattern of memory accesses to be made by the application, a predicted value of a hardware or operating system parameter, or a predicted value of a performance related parameter (e.g., based on a previous execution of the application or a similar application). The neural network may perform a training exercise to determine one or more transfer functions of the neural network, or may be self-training (e.g., using reinforcement learning), in various embodiments.

Figure 1:
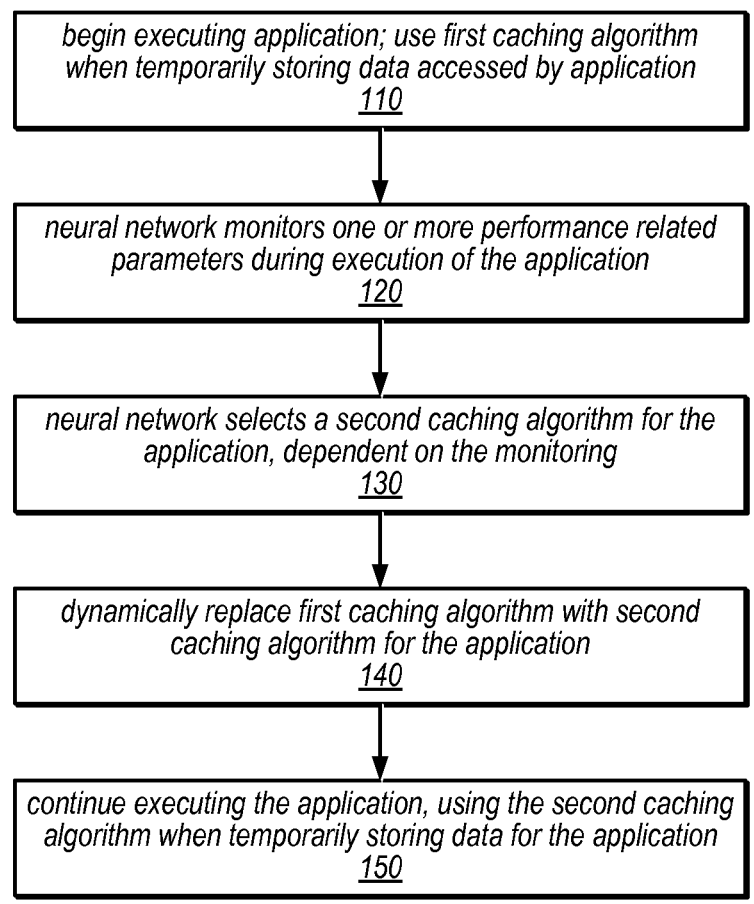
FIG. 1 is a flow diagram illustrating one embodiment of a method for using a neural network to select a caching algorithm, as described herein.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, a cache is a storage area in which data accessed and/or computed by an application may be temporarily stored and from which the stored data may be quickly retrieved when subsequently accessed. For example, some processors include one or more caches (e.g., L1 and L2 caches), and these small, fast memories may store copies of data and/or instructions accessed from a larger, slower main memory to reduce response time the next time they need to be accessed. In another example, a stand-alone or distributed computer system may include one or more small, fast memories that are used to store copies of program code, data, or other digital resources (e.g., web pages, documents, multimedia files, or other objects) that are stored in larger, slower memory (e.g., in system memory, in local or remote disk storage, or in a distributed storage system). When a requested resource (e.g., data object, web page, document, etc.) is found in the cache, this is referred to as a "cache hit". When a requested resource is not found in the cache, but must be fetched from main memory or a remote storage device, this is referred to as a "cache miss."

As noted above, when a cache is full, a caching algorithm may be applied to determine which data to remove to make room for new data to be cached. For example, the system may support one or more caching algorithms (also known as cache replacement algorithms, or cache replacement policies), including, but not limited to: Memcached, MemcacheDB, Least Recently Used (LRU), Most Recently Used (MRU), Least Frequently Used (LFU), Frequency Based Replacement (FBR), Least $k^{th}$-to-last Reference (LRU-k, e.g., LRU-2), or Least Frequently Recently Used (LFRU) replacement algorithms. However, as described in more detail below, various ones of these replacement policies may be better suited for some types of applications or usage patterns than for others. When a caching algorithm that is employed in the system is well suited for a particular application, executing within a particular system configuration and execution context, caching may greatly improve the performance of the application.

As noted above, neural networks may be used to model complex relationships between inputs and outputs (e.g., as non-linear statistical models), and can learn by example. Therefore, the use of neural networks may allow certain types of tasks to be performed in a manner that is both flexible and powerful. The systems and methods described herein may in some embodiments be used to apply neural networks to the task of designing an efficient cache, which may be referred to as a "neural cache". For example, in some embodiments, neural networks may be used to model the relationships between performance related inputs and outputs in the system in order to iteratively and dynamically select a suitable caching algorithm for a given application, resource request, and/or execution context (e.g., hardware and/or operating system configuration) during runtime. In some embodiments, the methods described herein for applying neural networks to the design of caches may also be highly scalable.

In some embodiments, neural networks may be used to design, modify, and/or reconfigure a neural cache. In some embodiments, neural networks may be used to accurately determine an optimal caching algorithm for a given data request to the neural cache, dependent on factors such as the usage pattern of application making the request, the cache size, the underlying hardware in the system, the parameters and/or state of the operating system, etc. (i.e. a caching algorithm that results in a corresponding optimal cache hit rate for the application in its execution context). The ability of the neural network to automatically (i.e. without manual intervention) adapt to changes in the application workload (or usage pattern), or changes in the hardware, software, and/or operating system environment in which the application is executing may be very useful in a real time application, where such changes can in some cases be frequent and/or unpredictable. Since neural networks are extremely fast and can often perform much of their computations in parallel, they may quickly detect and react to such changes and may dynamically select an appropriate caching algorithm for newly detected conditions. Thus, the use of a neural cache that is designed to iteratively and dynamically apply the optimal caching algorithm as conditions change during runtime may result in better application performance.

A neural network may in some embodiments include different types of "neurons" connected by a network of "synapses". For example, an input layer may include one or more input neurons, a hidden layer may include one or more neurons that serve as processing units, and an output layer may include one or more output neurons. In some embodiments, the synapses may carry information about the weighting of the inputs to each neuron, while in other embodiments weighting may be applied by the processing units in the hidden layer. In some embodiments, the neural network may be configured to collect input data reflecting the cache performance and/or overall application performance for an executing application (e.g. cache hit rates, data throughput, and/or memory access response time) to determine if the current caching algorithm is working well for the application in its current execution environment. For example, the neural network may be configured to examine the values of one or more CPU status registers whose values reflect performance related information (e.g., cache hits), to snoop traffic on one or more busses, or use other means to gather performance related information. If the performance of the application is unacceptable or is determined to be degrading/degraded over time, e.g., if the cache hit rate is out of a desired range, this may indicate that the current caching algorithm is not the appropriate caching algorithm for optimal performance of the application given the current state and/or conditions. In other words, this may indicate that the current caching algorithm is replacing items it should not yet replace, or is maintaining items in the cache that should be replaced. In this example, the neural network may be configured to take action to improve the cache hit rate (and thus, overall performance of the application) by selecting and applying a more appropriate caching algorithm for the particular situation, and iteratively adapting it when/if the situation changes again.

As described above, a neural network may be configured to dynamically select and apply a particular caching algorithm (e.g., by replacing a caching algorithm that was previously in use) during runtime for a given application. In other words, the selection of an appropriate caching algorithm may not be based entirely on a static analysis performed prior to execution of the application, but may be selected, applied, and/or modified during runtime. In addition to overall cache hit rates, data throughput rates, and/or memory access response times, inputs that may be gather by the input layer and provided to the hidden layer may include one or more of: data identifying requested resources (e.g., addresses of memory locations in which requested data, web pages, documents, or other resources are stored), data indicating the type of the resource, data indicating the type of access request (e.g., a request to store data, a request to retrieve data, or a request to modify stored data), data indicating the number and/or frequency of requests made for a given resource or group of resources, cache hit rates for a given resource or group of resources, or other performance related data, in various embodiments. In addition, the input layer may provide data indicating the values of various hardware configuration and/or operating system parameters to the hidden layer. For example, the input layer may provide data indicating the amount of memory allocated to one or more caches in the system (i.e. the cache size).

In some embodiments, the neural network may be configured to detect usage patterns (and/or changes in usage patterns) by analyzing some or all of the input data supplied by the input layer, and these usage patterns (or changes thereto) may be a major factor in selecting an appropriate caching algorithm, as described in more detail below. For example, an analysis of the distribution of accesses made in the system (e.g., many accesses of a few items versus a few accesses of many different items, or the distribution of accesses to the same or different items over time or across a wide range of addresses) may provide a heavily weighted input for the selection of a caching algorithm for the application. In some embodiments and for certain types of applications, usage patterns (e.g., as reflected in the overall workload of accesses made by the application and/or the distribution of those accesses) may be much more likely to change during execution of an application than either hardware or operating system parameters, and may be heavily weighted for that reason. However, in some embodiments, a change in a hardware or operating system parameter value may trigger an analysis of the current inputs by the neural network, which may or may not lead to a change in the caching algorithm.

In some embodiments, detection of a particular input value may trigger the neural network to select (or to determine whether to select) a replacement caching algorithm for temporarily storing data accessed by a given executing application. For example, if the value of one of the performance related parameters meets or exceeds a pre-determined threshold value (e.g., a cache hit rate below a given acceptable level), the neural network may be configured to analyzed the current set of inputs and to output an indication of an appropriate caching algorithm for the current application and execution contexts. In some cases, the result may be a change in the caching algorithm in response to the trigger. In other cases, even if a particular input value triggers an analysis by the neural network, the output may indicate that the caching algorithm should not be changed at that point (e.g., if none of the available alternate caching algorithms are likely to improve performance). In some embodiments, the neural network may perform periodic sampling of the input values provided by the input layer, and the result of the analysis for some input combinations may result in a change in the caching algorithm for the currently executing application. In embodiments in which periodic sampling is used, the sampling rate may be fixed, may be adaptive to the frequency of changes observed in the system configuration or application workload, or may be different for a training phase and a production phase, or different for an initial execution phase and an execution phase in which the performance of the application appears to have stablized.

Note that in some embodiments, and for some sets of inputs, the neural network may output a selection of a caching algorithm that uses a different basis for determining which cached items should be replaced to make room for storing new items in the cache. For example, the analysis by the neural network may indicate that cache performance or overall application performance may be improved by replacing a caching algorithm that replaces the least recently used entries with a caching algorithm that replaces the most recently used entries or the least frequently used entries, and the output of the neural network may be a value or signal that initiates such a change.

In some embodiments, the result of the analysis by the neural network may be that the same caching algorithm is used following the analysis, but the value of one or more configuration parameters of the system or of the caching algorithm itself is changed. For example, while increased cache size may improve performance, cache designers may have to make a trade-off between potential performance improvements and the amount of fast-access memory (which may be more expensive and may occupy valuable nearby real-estate) allocated for a cache vs. other storage functions. In some embodiments, the analysis performed by the neural network may determine that applications with certain usage patterns can achieve the acceptable performance using a smaller cache. Therefore, in different examples, an output of the neural network may be a value or signal that causes the system to dynamically allocate more resources to an application (e.g., increasing the available cache size) to increase cache performance, or to dynamically allocate fewer resources to the application (e.g., by reallocating some of the resources to another application) if acceptable cache performance can be maintained for the application with a smaller available cache. In another example, an output of the neural network may be a value or signal that causes the system to dynamically modify a threshold value that determines how many entries are replaced by the caching algorithm and/or when they are replaced. In still other embodiments, the result of the analysis by the neural network may be that the cache type itself is changed. For example, the analysis may indicate that cache performance or overall application performance may be improved by using a set-associative cache or a fully associative cache rather than a direct-mapped cache, and the output of the neural network may be a value or signal that initiates such a change in the system.

As noted above, in some embodiments, a neural network may be configured to detect a change in a workload of the application (e.g., a change in the type of work done by the application; the number, frequency, and/or distribution of accesses to the same or different addresses or items by the application; the time between access to the same or different addresses or items by the application; the number of different addresses or items accessed by the application; the locality of the accesses by the application, etc.) and may apply a statistical analysis of the effects of such changes on the cache performance and/or overall performance of the application, using the current caching algorithm. As a result, and dependent on a fixed (e.g., pre-determined) or adaptive weighting applied to each of the inputs to the analysis, the neural network may select a caching algorithm that may improve performance, or may determine that the current caching algorithm is suitable for the current application, conditions, and execution context.

In some embodiments, selection of an initial caching algorithm may be based on a default selection for the system or for a given application or application type. In other embodiments, selection of an initial caching algorithm for temporarily storing data accessed by a given application may be performed by a neural network dependent on a known or predicted pattern of accesses, known and/or predicted hardware or operating system parameter values, and/or known or predicted performance related parameter values. For example, in some embodiments, historical cache hit rates for a previous execution of the given application or a similar application (i.e. one that has supplied similar inputs to the neural network) may be input to the neural network for selection of an initial caching algorithm. In another example, the neural network may be configured to determine outputs by interpolating between outputs generated for two or more other sets of inputs within a given statistical range of the inputs provided on behalf of the given application. In other embodiments, inputs and/or outputs from a training phase (such as one described below) may be analyzed by the neural network for selection of an initial caching algorithm.

Note that in some embodiments, all of the available caching algorithms supported in the system are fixed and/or known. In other embodiments, additional caching algorithms or modified versions of previously known caching algorithms may be generated by the neural network (e.g., by changing one or more parameter values associated with the caching algorithm or underlying hardware or software), or added by the cache designer over time. Similarly, in some embodiments, one or more of the available caching algorithms may be removed or disabled by the neural network or cache designer (e.g., in response to determining that it is unlikely to result in acceptable performance given the current hardware configuration and/or operating system parameters). A neural network used to select an appropriate caching algorithm may adapt to such changes in the available caching algorithm options.

FIG. 1 illustrates one embodiment of a method for using a neural network to determine a suitable caching algorithm. As illustrated at 110, in this example, the method may include beginning execution of an application in a system that includes a neural network. When execution begins, the method may include using a first one of a plurality of caching algorithms supported in the system when temporarily storing (i.e. caching) data accessed by the application. For example, the system may support one or more caching algorithms (also known as cache replacement algorithms or cache replacement policies), including, but not limited to: Memcached, MemcacheDB, Least Recently Used (LRU), Most Recently Used (MRU), Least Frequently Used (LFU), Frequency Based Replacement (FBR), Least $k^{th}$-to-last Reference (LRU-k, e.g., LRU-2), or Least Frequently Recently Used (LFRU) replacement algorithms. The first caching algorithm applied during execution of the application may in various embodiments be selected as a default caching algorithm, as a most recently applied caching algorithm, or based on a historical or predicted workload for the particular application or a similar application, as described in more detail below.

As illustrated at 120 in FIG. 1, the method may include a neural network monitoring one or more performance related parameters during execution of the application. For example, an input layer of the neural network may gather and/or receive inputs indicating data accesses made by the application, a rate of accesses made by the application, a cache hit rate, a data throughput rate, an access response time (e.g., an average, current, or maximum memory access time experienced in response to one or more memory access requests), various hardware parameter values, various operation system parameters, and/or other information that may reflect and/or affect the performance of the application in the system. As illustrated at 130, the method may include the neural network selecting a second caching algorithm for the application, dependent on the results of the monitoring. For example, if any of the monitored parameters indicates an unacceptable level of performance, a deterioration of performance, or a change in the hardware or software parameters of the system that may affect the performance of the application, the hidden layer of the neural network may be configured to determine a more suitable caching algorithm for the application, based on the current state and/or the value of one or more of the monitored parameters.

Once a second caching algorithm has been selected, the first caching algorithm may be dynamically replaced with the second caching algorithm for the application (i.e. during its execution), as in 140, and the system may continue executing the application, using the second caching algorithm when temporarily storing data for the application, as in 150.

Figure 2:
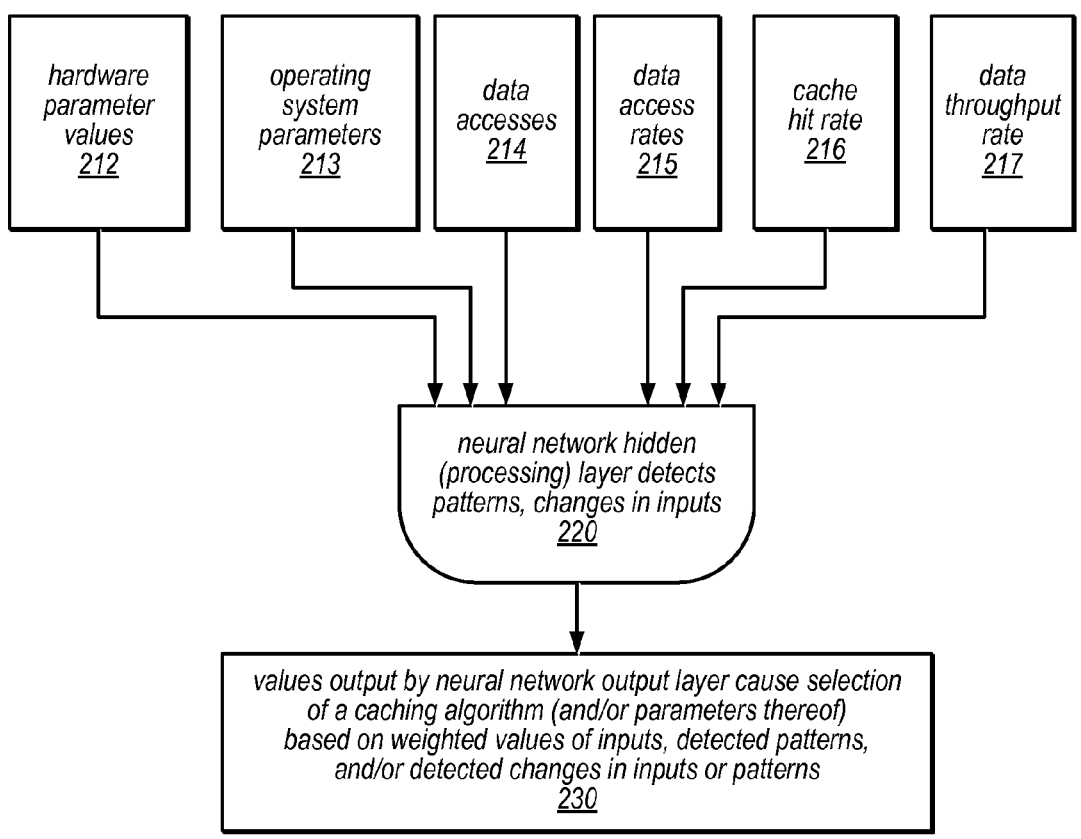
FIG. 2 is a data flow diagram illustrating the operation of a neural network, according to one embodiment.

FIG. 2 illustrates the operation of a neural network used in determining a caching algorithm for use with an executing application, according to one embodiment. In this example, an input layer of the neural network monitors, gathers, and/or otherwise provides the following inputs to the hidden layer of the neural network: hardware parameter values 212, operating system parameters 213, information about data accesses 214, data access rates 215, cache hit rate data 216, and a data throughput rate 217. In other embodiments, the input layer of the neural network may monitor, capture and/or provide more, fewer, or different performance related parameter values than those illustrated in FIG. 2. For example, in some embodiments, the input layer may capture data regarding a current or average access response time for memory accesses when the requested item is found in the cache, for accesses when the requested item is not found in the cache, for accesses directed to a particular cached item, or for all memory accesses requested by the application.

As illustrated by element 220, in this example, the hidden layer of the neural network (sometimes referred to as the "processing" layer) may detect patterns in the inputs received and/or changes in the values of those inputs. For example, the hidden layer of the neural network may include a collection of neurons, or processing units, each of which may be configured to analyze a portion of the input data provided to the neural network as part of determining the output of the neural network. The transfer function applied by each of the neurons may generate one or more outputs based on the inputs (and in some cases, the current state of the system or application being executed), or may contribute to the final value of one or more outputs of the neural network. The transfer function applied by the neural network hidden layer may include a comparison of the values of one or more inputs to corresponding threshold values, a comparison of the values of one or more inputs to various combinations of input values for which an optimal caching algorithm has already been determined (e.g., during a training phase or through previous use in the system), a linear or sigmoid function, an interpolation function, or a function to determine a previously observed set of inputs that most closely matches the current set of inputs. In some embodiments, the inputs to the neural network may be weighted according to a fixed (e.g., pre-determined) weighting, or using a weighting that may be automatically or manually adapted to improve the performance of the neural network itself.

Values output by the output layer of the neural network may cause selection of a caching algorithm (and/or parameters thereof) based on the weighted values of inputs, detected patterns, and/or detected changes in inputs or patterns, as shown in 230. In some embodiments, there may be only one output of the neural network, and its value may be used to select an appropriate caching algorithm for a currently executing application based on the inputs to the neural network. In other embodiments, there may be multiple outputs of the neural network, one or more of which may be used to select an appropriate caching algorithm, and others of which may be used to select and/or modify the value of one or more parameters of the selected caching algorithm and/or system configuration (e.g., a cache size, a cache type, or other configuration parameters). Note that in some embodiments, a neural network may include a hierarchy of input layers (or input components thereof), neurons (processing units), and/or output layers. One embodiment of a neural network that includes a hierarchy of processing units is illustrated in FIG. 3 and described below.

In various embodiments, a neural network may be implemented using hardware elements, software modules, or using a combination of hardware and software components. For example, in some embodiments, the input layer of a neural network may be implemented, at least in part, using circuitry configured to collect performance related data and provide it to the hidden layer. In other embodiments, the input layer may include one or more software modules configured to gather (e.g., read or otherwise determine) values stored or generated by a hardware component (e.g., a performance counter or performance related status register, a snoop circuit that captures bus traffic, an operating system parameter register, or a hardware configuration status indicator), and to provide those values to the hidden layer of the neural network. For example, a neural network configured to select an appropriate caching algorithm for an application may be implemented as a computer program product, or software, that may include a non-transitory, computer-readable storage medium having stored thereon instructions, which may be used to program a computer system (or other electronic devices) to perform the techniques described herein.

In some embodiments, the hidden layer may be implemented, at least in part, using a collection of hardware processing units, such as one or more state machines or other logic/circuitry configured to detect patterns or changes in patterns in the inputs provided by the input layer, and to provide one or more outputs that cause various actions to be taken in the system, such as selecting a caching algorithm or a parameter value thereof, or replacing one caching algorithm (or parameter thereof) with another, as described herein. In other embodiments, the hidden layer of the neural network may be implemented, at least in part, by one or more software modules configured to analyze input data and provide one or more output values that cause various actions to be taken in the system, such as selecting a caching algorithm or a parameter value thereof, or replacing one caching algorithm (or parameter thereof) with another, as described herein. In some embodiments, the hardware components and/or software modules that implement the neural network may be configured to operate concurrently, and may thus perform efficient parallel processing of the input information and provide a fast determination of the appropriate outputs/actions to be taken in the system. Note that in some embodiments, one of the valid actions resulting from an analysis performed by the hidden layer of the neural network is that the caching algorithm and system configuration are not changed (e.g., if it is determined that performance is unlikely to be improved by a change).

Figure 3:
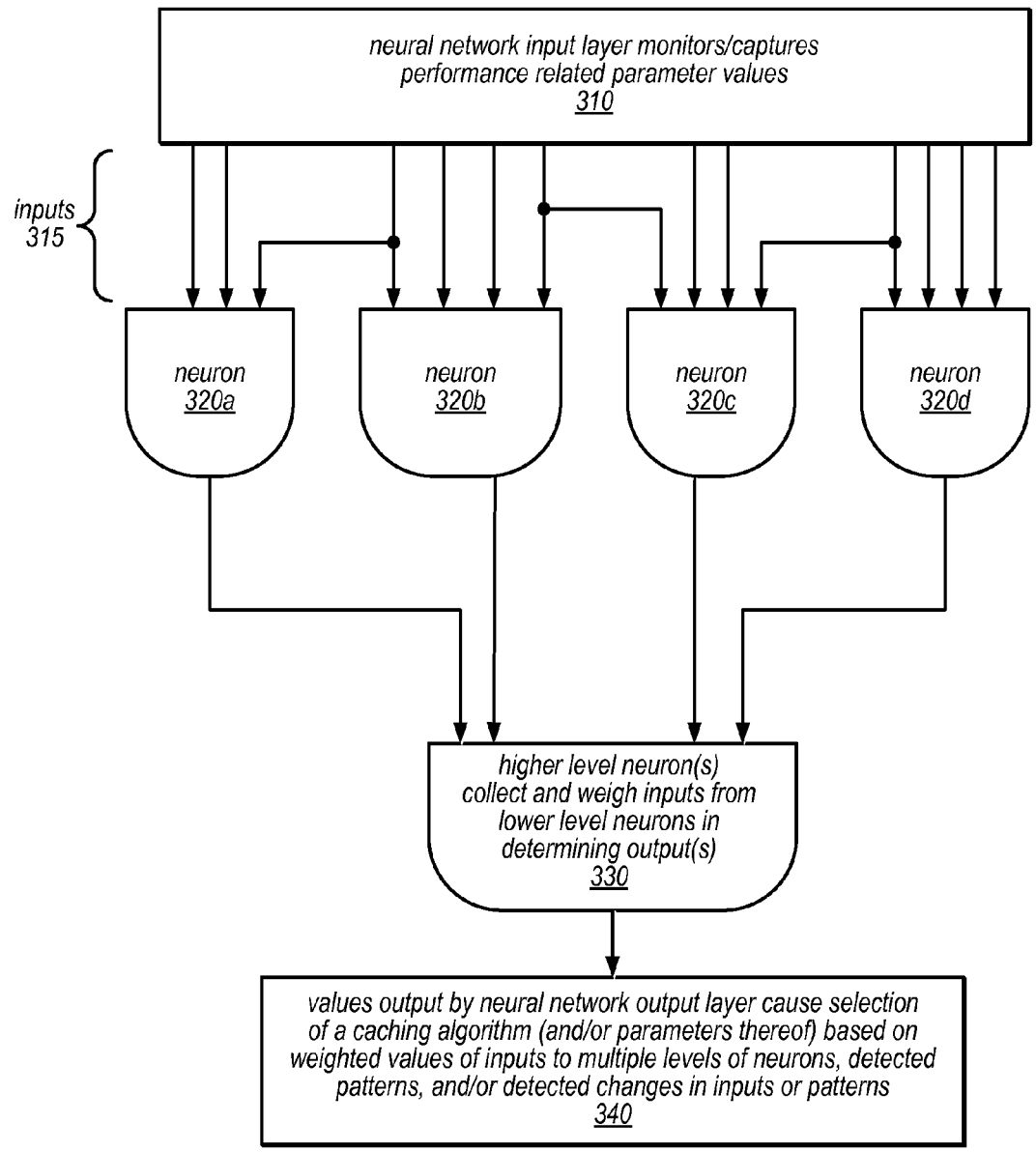
FIG. 3 is a data flow diagram illustrating the operation of a neural network that includes a hierarchy of neurons at multiple levels, according to one embodiment.

FIG. 3 illustrates the operation of a neural network that includes a hierarchy of neurons (processing units) and that is used in determining a caching algorithm for use with an executing application, according to one embodiment. In this example, an input layer 310 of the neural network monitors, captures, and/or otherwise provides various inputs 315 to the hidden layer of the neural network. As described herein, these inputs may include any of all of hardware parameter values, operating system parameters, information about data accesses, data access rates, cache hit rate data, data throughput rates, access response times, and/or other performance related parameter values.

As illustrated in this example, the hidden layer of the neural network may include multiple levels of neurons, or processing units, such as a first level comprising neurons 320a-320d, and a second level comprising one or more higher level neurons 330. In this example, each of the neurons 320 may be configured to analyze a different subset of the inputs 315 provided by the input layer to the hidden layer. For example, one neuron may be configured to test for and/or detect whether a given input value meets or exceeds a predetermined threshold value for the corresponding parameter; another neuron may be configured to detect a change in a cache hit rate, throughput rate, access response time, or other performance related data rate; still another neuron may be configured to compare the values of a collection of inputs to previously observed values for the collection of inputs for which an optimal algorithm has been determined (e.g., during a training phase or through previous use in the system); and yet another neuron may be configured to detect patterns in the values of one or more inputs (e.g., a series or progression of values over time). As illustrated in FIG. 3, some inputs 315 provided by the input layer may serve as inputs to more than one of neurons 320, while others may be provided to a single neuron 320. As noted above, the inputs to the neural network may be weighted according to a fixed (e.g., pre-determined) weighting, or using a weighting that may be automatically or manually adapted to improve the performance of the neural network itself. In addition, it should be noted that in some embodiments, different weightings may be applied to each of the inputs provided by the input layer and/or to any intermediate outputs used as inputs to a higher level of neurons in the hidden layer (e.g., the outputs of neurons 320a-320d, which serve as inputs to neuron(s) 330 in FIG. 3).

As in the previous example, values output by the output layer of the neural network may cause selection of a caching algorithm (and/or parameters thereof) based on the weighted values of the inputs to multiple level of neurons, detected patterns, and/or detected changes in inputs or patterns, as shown in 340. As in the previous example, the multi-level neural network illustrated in FIG. 3 may implemented using any combination of hardware components and/or software modules configured to perform the collection of performance related input data, the analysis of the input data, and the output of one or more values that cause an action to be taken by the system regarding the selection of an appropriate caching algorithm for the current hardware configuration, operating system configuration, application state, workload, etc. Note also that while FIG. 3 illustrates an embodiment in which the neural network includes a two-level hierarchy of neurons, in other embodiments, a neural network may include an arbitrary number of levels at the input layer, hidden layer, and/or output layer.

Figure 4:
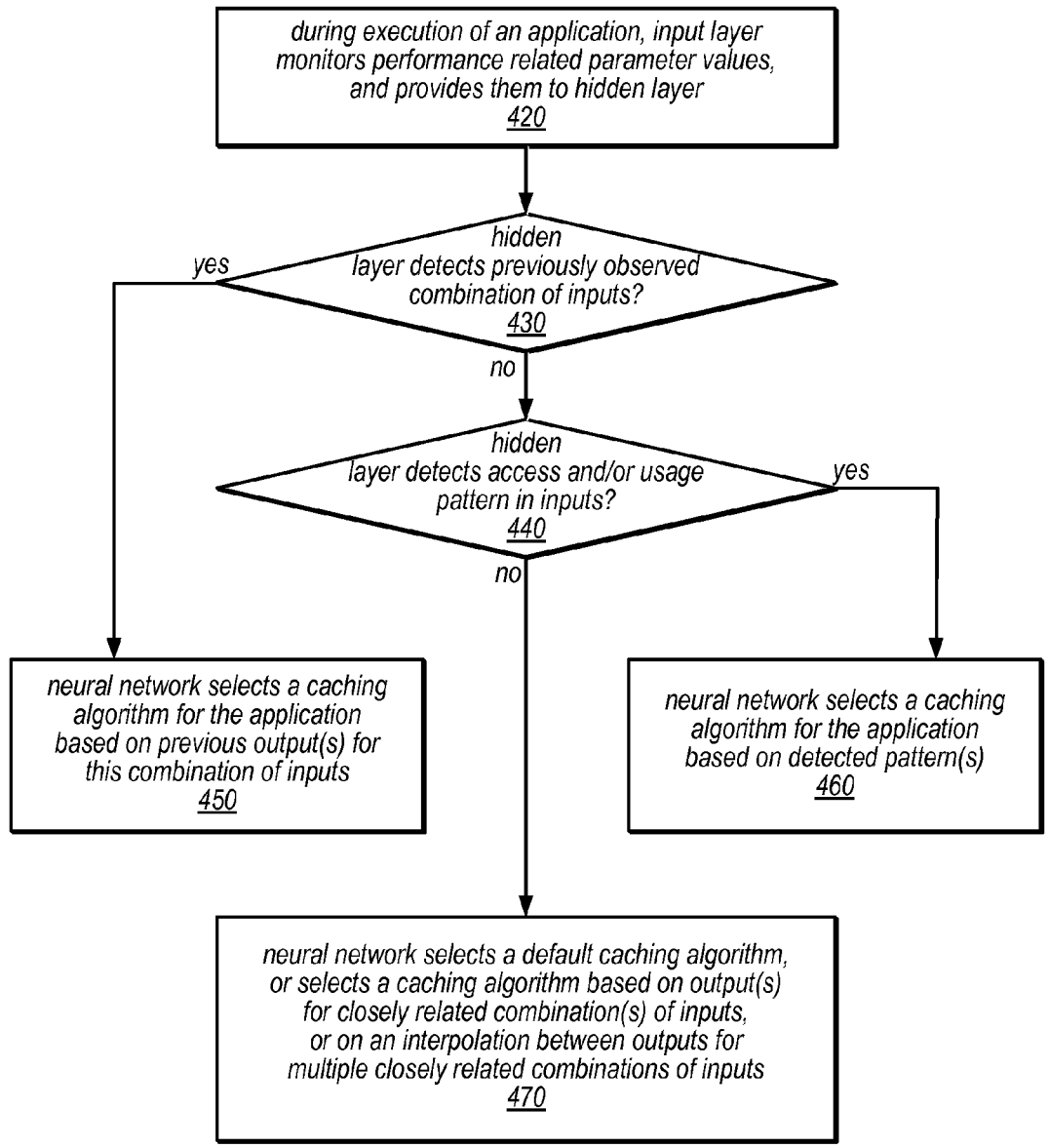
FIG. 4 is a flow diagram illustrating one embodiment of a method for detecting patterns in performance related inputs using a neural network.

FIG. 4 illustrates one embodiment of a method for selecting an appropriate caching algorithm by detecting patterns using a neural network. As illustrated in this example, the method may include an input layer of the neural network monitoring values performance related parameter values, such as those described herein, during execution of an application, and providing them to the hidden layer of the neural network, as in 420. As illustrated at 430, the method may include the hidden layer determining if the values of the current inputs match a previously observed combination of input values, as in 430. If so, shown as the positive exit from 430, the method may include the neural network selecting (or causing the selection of) a caching algorithm for the application based on previous value(s) output by the neural network for this combination of input values, as in 450. For example, the neural network may avoid selecting a caching algorithm that was previously determined to be suboptimal for this combination of input values (i.e. one that did not improve performance, or that let to degraded performance), or to select a caching algorithm that was previously determined to be well suited for this combination of input values (e.g., one that improved performance or resulted in performance in an acceptable range during a training phase or as a result of a previous analysis by the neural network for this combination of input values during the current or a previous execution of the application).

If the hidden layer determines that the current combination of input values does not match a previously observed combination of input values, shown as the negative exit from 430, the method may include the hidden layer determining whether the current inputs indicate an access pattern or usage pattern for the accesses made by the application, as in 440. For example, the hidden layer may be configured to detect that accesses are to items having a repeating or alternating pattern of addresses, or that addresses of items accessed follow a mathematical series or progression, e.g., stepping through addresses incrementally, or following another pattern of accesses. In some embodiments, the hidden layer may be configured to detect a pattern in the distribution of accessed (e.g., a few items are accessed many times, or many items are each accesses only a few times). In still other embodiments, the hidden layer may be configured to detect a pattern in the frequency of accesses or the time between accesses to the same or different items. In this example, if any of these or other types of patterns are detected, shown as the positive exit from 440, the method may include the neural network selecting (or causing the selection of) a caching algorithm for the application based on the detected pattern or patterns, as in 460. For example, if it is determined that a few items are accessed many times, and others are accessed only rarely, the neural network may select a least frequently used (LFU) caching algorithm for the application.

If no patterns are detected in the accesses or usage of accesses made by the application, shown as the negative exit from 440, the method may include the neural network selecting (or causing the selection of) a default caching algorithm, or a caching algorithm selected for the application based on one or more outputs generated for a closely related combination of inputs, or through interpolation of the outputs generated for two or more closely related combinations of inputs, as in 470.

Note that in different embodiments, a neural network configured to select an appropriate caching algorithm may "learn" through different means. For example, some neural networks may learn through a supervised learning approach, in which the neural network is presented with a training set of inputs and corresponding outputs. In such embodiments, the neural network may be configured to "learn" the transfer functions to be performed by the hidden layer by the mapping functions implied by the data set. In other embodiments, a neural network may learn through unsupervised learning, i.e. through self-training. In such embodiments, the neural network may be presented with data and one or more cost functions to be minimized (e.g., cache misses or average response time), and the neural network may be configured to determine the transfer functions that minimize those costs.

In some embodiments, a neural network, such as those described herein, may apply reinforcement learning techniques when to the selection of caching algorithms for various applications. Reinforcement learning is a machine learning technique in which actions to be taken are not pre-determined, but are learned through iterative interactions with the system, e.g., through trial-and-error. With reinforcement learning, the goal may be to determine, and then further refine, policies for selecting actions to be taken such that one or more long-term cost measurements are minimized. For example, in each of a series of interactions, the system may determine the current state (e.g., based on performance related parameter values gathered by the input layer of the neural network), and may choose an action to take based on the current state (e.g., continuing execution using the currently selected caching algorithm, or selecting and applying a different caching algorithm). The system may then measure the effect of the action (e.g., by measuring the performance of system in terms of cache hit rates, data throughput, and/or access response times), and assign a reward value to the action taken for that set of inputs (which may be positive or negative). Over time, the system builds a policy, or set of policies, which specify the actions to be taken for different combinations of inputs, and refines them as rewards are measured each time an action is taken. The policies may define the expected reward for each input/output set, which may also be refined over time as more actions are taken and the actual (observed) rewards are measured. Various reinforcement learning techniques may be applied in a neural network to allow the neural network to learn the appropriate caching algorithms to be applied in different situations (e.g., depending on the hardware or operating system configuration, workload, cache size, etc.).

One reinforcement learning technique that may be applied is the State-Action-Reward-State-Action (SARSA) method of reinforcement learning. With this method, for each iteration, the current state of the system is observed (e.g., by the input layer of the neural network), and an action is taken (e.g., replacing the current caching algorithm with a different caching algorithm). The action taken may be one that is estimated to be the best action to be taken in the current state (e.g., based on current input/action/reward values maintained by the neural network), a random action, or an action that is believed to be suboptimal for the current state. Choosing an action that is random, or that is believed to be suboptimal may in some embodiments allow the neural network to explore different options and find better solutions over time. After taking an action, the neural network may observe any changes in the system to determine whether the action improved the performance of the system (in which case the input/action combination may be assigned a positive reward value) or caused the performance to degrade (in which case the input/action combination may be assigned a negative reward value). The input/action/reward values maintained by the neural network (e.g., in a data structure or through the configuration of combinational logic that provides this functionality) may be updated after each such iteration to allow the neural network to improve its performance in selecting suitable caching algorithms for applications given their situational/execution context. Based on the updated values, and any observed change of state, the neural network may take further action in an attempt to identify an optimal caching algorithm.

Figure 5:
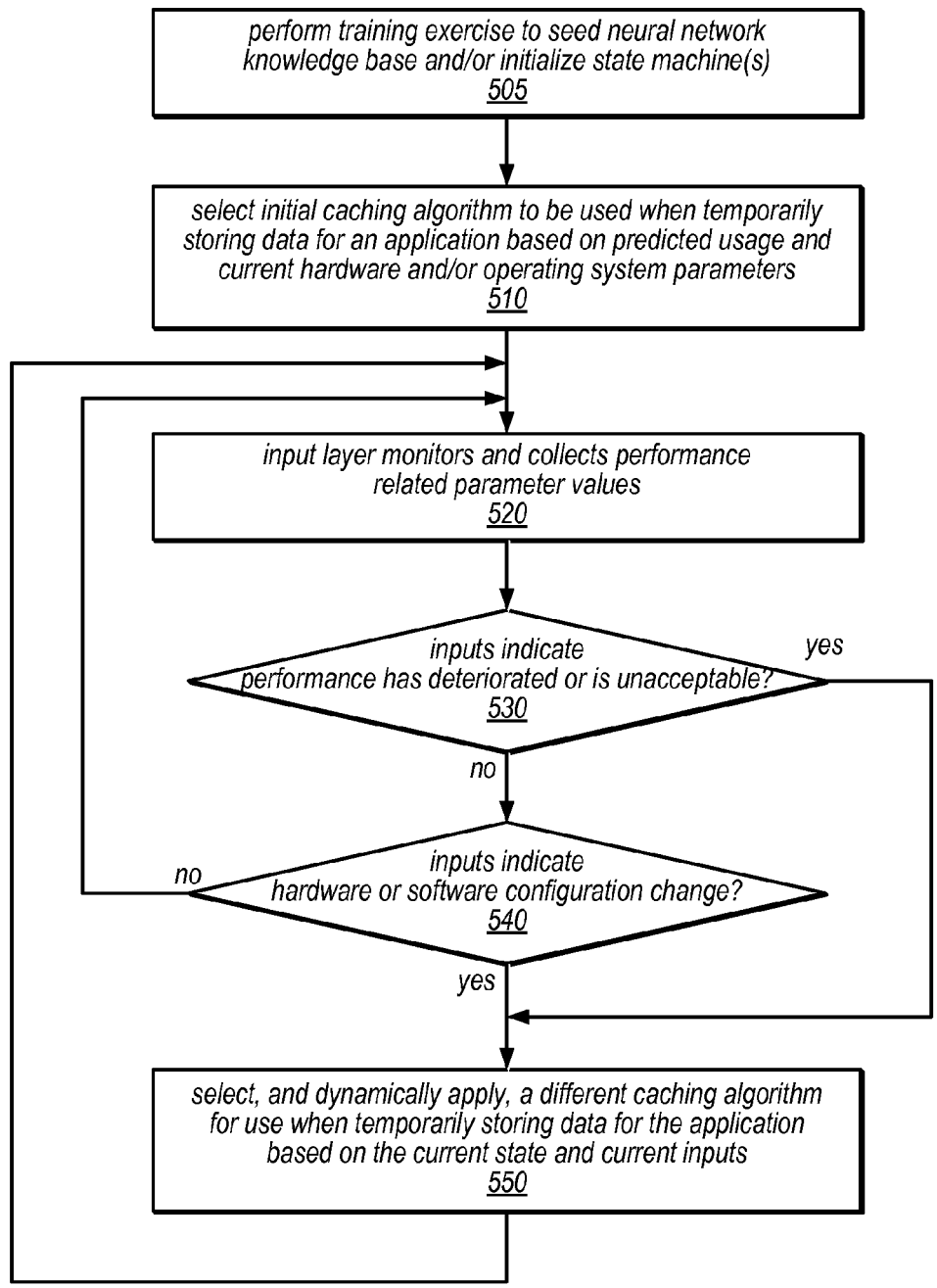
FIG. 5 is a flow diagram illustrating one embodiment of a method for iteratively and dynamically selecting a caching algorithm for an application.

FIG. 5 illustrates one embodiment of a method for iteratively and dynamically selecting various caching algorithms for temporarily storing data accessed by an application. As illustrated at 505 in this example, in some embodiments, the method may include performing a training exercise to seed the neural network knowledge base and/or initialize one or more state machines of the neural network. In other embodiments, there may not be a training phase. Instead, the neural network may be self-trained using reinforcement learning or other self-training techniques (such as those described herein) while it is being used to dynamically select one or more caching algorithms for use with an application executing in a production (i.e. a real-world) computing environment.

As illustrated at 510, in some embodiments the method may include selecting an initial caching algorithm to be used when temporarily storing data for an application based, at least in part, on predicted usage and current hardware and/or operating system parameters. For example, in some embodiments, usage and/or performance of an application while employing various caching algorithms given current hardware and/or software parameter values may be predicted based the results of a training exercise, or based on the previous performance of the system under similar circumstances. In other embodiments, the initial caching algorithm may be selected based on a default caching algorithm for the system, for the current application, or for applications of the same or a similar type.

As illustrated at 520, the method may include an input layer monitoring and collecting performance related data, including, but not limited to, the values of any or all of the performance related parameters and/or system parameters described herein. If, at any point during execution of the application, the combination of inputs indicate that performance of the application is unacceptable, or has deteriorated, shown as the positive exit from 530, the method may include selecting, and dynamically applying, a different caching algorithm for use when temporarily storing data for the application, as in 550, and that selection may be based on the current state of the application and on the current inputs. For example, in some embodiments, the dynamic selection of a new caching algorithm may be triggered by detection of a threshold value for one or more performance measurements (e.g., by a cache hit rate or data throughput rate falling below an acceptability threshold), or by detection in a decline in a throughput or cache hit rate (e.g., a decline greater than or equal to a predetermined percentage change), or an increase in a current, average, or maximum access response time.

Similarly, if, at any point during execution of the application, the combination of inputs indicate that one or more values of hardware or software configuration parameters has changed (e.g., if an operating system parameter value has changed or allocation of memory in the system has changed), the method may include selecting, and dynamically applying, a different caching algorithm for use when temporarily storing data for the application, and that selection may be based on the current state of the application and on the current inputs. This is illustrated as the path from the positive exit from 540, and 550. Again note that in some circumstances, the neural network may select the current caching algorithm as the optimal caching algorithm (i.e. resulting in no change in caching algorithm or any parameters thereof).

As illustrated in FIG. 5, until or unless a performance related issue (or another performance related issue) is detected, or a change in a hardware or software configuration parameter (or another hardware or software configuration parameter change) is detected, the method may include the input layer continuing to monitor and collect performance related parameter values while the application continues to execute (e.g., until execution is complete). When either condition is met, the method may include selecting, and dynamically applying, another caching algorithm for the application. This iterative process is illustrated in FIG. 5 by the feedback loops from 540 and 550 to 520.

Figure 6:
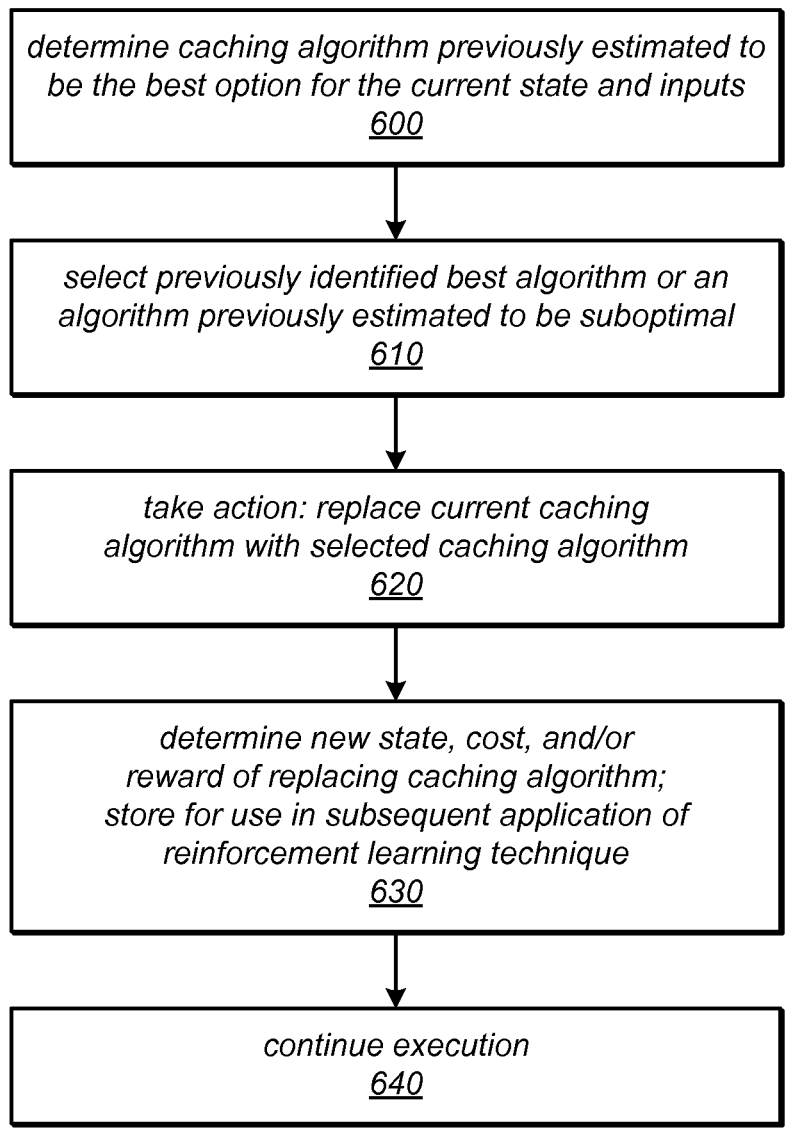
FIG. 6 is a flow diagram illustrating one embodiment of a method for applying reinforcement learning in a neural network.

As noted above, in some embodiments, one or more of the processing units (neurons) of a neural network may apply a reinforcement learning technique when determining an appropriate caching algorithm for a given application and/or execution context. FIG. 6 illustrates one embodiment of a method for applying reinforcement learning in a neural network to select a caching algorithm for an application. For example, the method may in some embodiments be used to select a caching algorithm for one of the iterations of the method illustrated in FIG. 5. As illustrated in this example, the method may include determining a caching algorithm that was previously estimated to be the best caching algorithm for the current state and inputs collected during execution of an application, as in 600. In some embodiments, the current state of the application (with respect to its cache performance or overall performance) may be reflected in one or more observed performance related values (e.g., a cache hit rate or data throughput rate that is "high", "medium" or "low" or that is "within range" or "out of range"). In some embodiments, a caching algorithm may have been previously estimated to be the best caching algorithm for the current state and inputs during a training phase or during a previous iteration of a self-training technique based on one or more actions taken for the same combination of state and inputs and corresponding costs or rewards observed in response to that action.

After determining a caching algorithm that was previously estimated to be the best caching algorithm for the current state and inputs (or for a similar combination of state and inputs), the method may include selecting either the previously identified (estimated) best caching algorithm or a caching algorithm that was previously estimated to be suboptimal for the current state and inputs (or for a similar combination of state and inputs), as in 610. For example, in some embodiments, a neural network that employs a reinforcement learning technique may be configured to occasionally select a caching algorithm that has not previously been selected for the current combination of inputs or that was previously determined to be suboptimal for the current combination of inputs in order to discover or refine an estimate of the effects of such a selection.

As illustrated at 620, the method may include taking action based on the selection of a caching algorithm, in this case, replacing the current caching algorithm with the selected caching algorithm. As illustrated at 630, in this example, in some embodiments the method may include determining the new state of the application in response to the change in the caching algorithm. As illustrated in FIG. 6, the method may also include determining the cost of the change and/or the reward (whether positive or negative) due to the change. This information may be stored for use in a subsequent application of the reinforcement learning technique in the neural network, such as in a subsequent iteration of the techniques illustrated in FIG. 5. For example, this information may be added to or updated in a collection of input/action/reward values maintained by the neural network (e.g., in a data structure or through the configuration of combinational logic that provides this functionality). The method may then include continuing execution using the replacement caching algorithm, as in 640. In various embodiments, reinforcement learning techniques may be applied by any or all of the neurons in the neural networks described herein.

The methods described herein for selecting an appropriate caching algorithm using a neural network may in various embodiments be applied to a wide range of applications and across a variety of system configurations that include caches. For example, they may be applied to select a replacement policy for data stored in a level 1 (L1) or level 2 (L2) cache within a processor, in an on-chip or off-chip level 3 (L3) cache, or in a portion of main memory or disk memory allocated for use as cache in a particular computer system. These techniques may in other embodiments be used to select a replacement policy in a distributed computing system, such as in a cloud computing environment that provides data, web pages, documents, or other resources to multiple applications or users. In some embodiments, a neural network may be used to select or modify a caching algorithm in response to changes in an application's workload or the allocation or re-allocation of resources by a load balancing mechanism. For example, frequently requested web pages, such as "frequently asked questions" pages, may be cached on an application server that provides them to a user, rather than having to be re-fetched from disk storage each time they are requested. In this situation, the cache may apply a least frequently used policy for replacing items in the cache. On the other hand, in a system in which web pages are accessed in a more random manner, a least frequently used policy for replacing items may not be appropriate. Instead, a replacement policy that is more suited for random accesses may be selected, such as one that takes a page ranking into account when determining which pages to replace in the cache.

A system that uses a neural network in selecting an appropriate caching algorithm for a given application and its execution context may result in improved application performance when compared to a system that applies only a single caching algorithm (e.g., one that always deletes the oldest items when the cache is full, or one that always deletes the newest items when the cache is full). In some embodiments, the more data is provided to the neural network, the more accurate its selections may be. In such embodiments, the neural network may learn quickly in high traffic situations. In some embodiments, in addition to selecting a caching algorithm from among a collection of known caching algorithms, a neural network may be configured to apply a new (e.g., ad hoc) caching algorithm in an attempt to improve performance.

As previously noted, the neural networks described herein may in some embodiments be provided as a computer program product, or software, that may include a non-transitory, computer-readable storage medium having stored thereon instructions, which may be used to program a computer system (or other electronic devices) to perform the techniques described herein. For example, the functionality of various neurons described herein may be embodied in various standalone software modules, or in modules in a runtime library, according to different embodiments. In various embodiments, a computer-readable medium may include any mechanism for storing or transmitting information in a form (e.g., software, processing application) readable by a machine (e.g., a computer). A computer-readable storage medium may include, but is not limited to, magnetic storage medium (e.g., floppy disk); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

Figure 7:
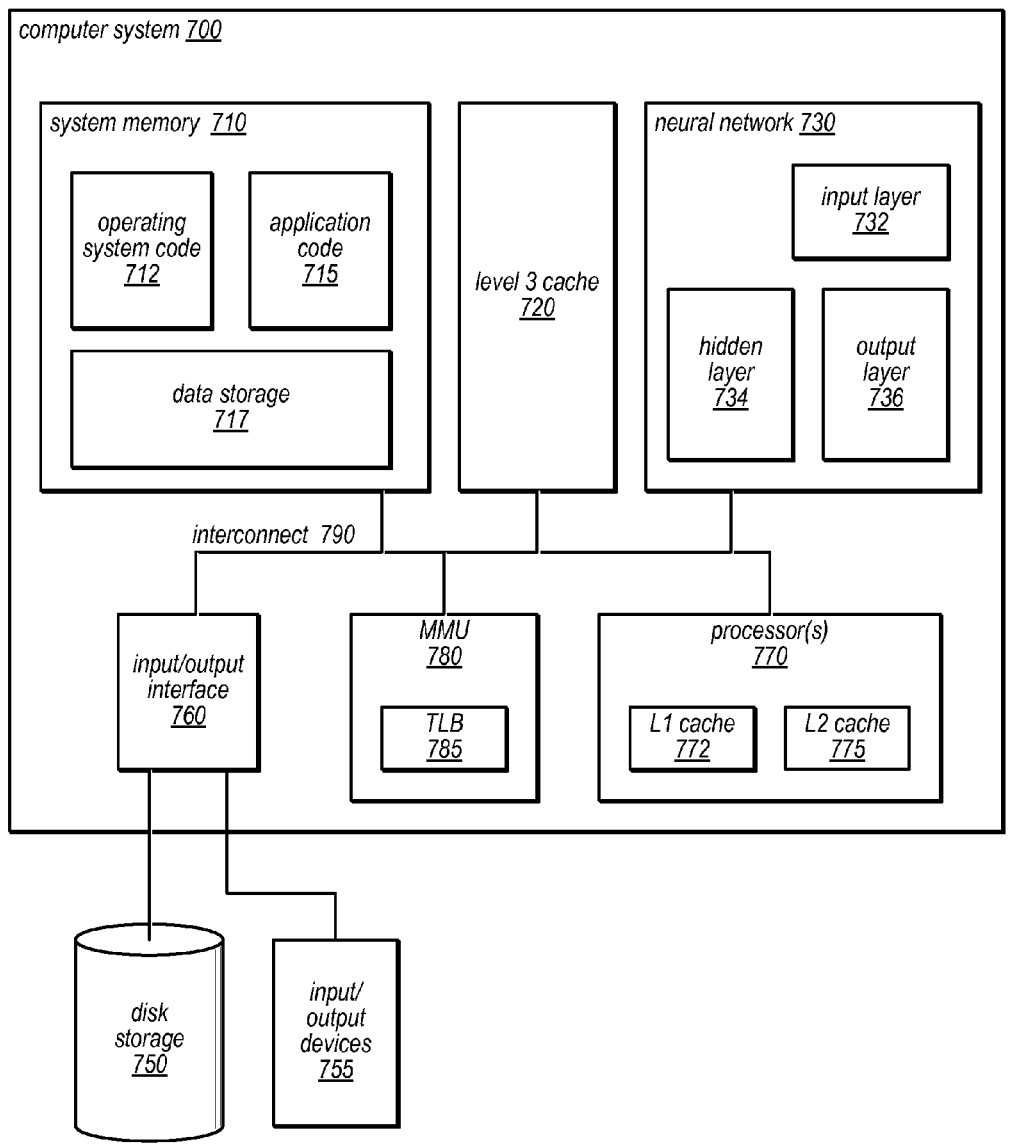
FIG. 7 is a block diagram illustrating a computer system configured to implement selecting caching algorithms using a neural network, as described herein.

In some embodiments, the techniques described herein for selecting an appropriate caching algorithm using a neural network may be implemented in any of a wide variety of computing systems. FIG. 7 illustrates a computing system configured to perform selecting an appropriate caching algorithm using a neural network, as described herein and according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

As illustrated in FIG. 7, a computer system 700 may include system memory 710 (e.g., one or more of cache, SRAM DRAM, RDRAM, EDO RAM, DDR RAM, SDRAM, Rambus RAM, EEPROM, etc.), one or more processors 770 (each of which may include one or more caches, such a L1 cache 772 and L2 cache 775), a memory management unit (MMU) 780 (which may include a translation lookaside buffer, such as TLB 785), one or more input/output interfaces 760, a level 3 (L3) cache 720, a neural network 730, and an interconnect 790. Computer system 700 may in some embodiments be communicatively coupled to one or more remote storage devices, such as disk storage 750, and may also be coupled to one or more input/output devices 755.

As described herein, neural network 730 may include an input layer 732, a hidden layer 734 (which may be implemented as a single level of processing units, or a hierarchy of processing units, as described herein), and an output layer 736 (which may provide outputs to control various actions, such selecting and dynamically replacing a caching algorithm and/or parameters thereof. In various embodiments, neural network 730 may be implemented in hardware (e.g., as dedicated circuitry or a co-processor), in software (e.g., as program instructions that when executed on one or more processors 770 implement the functionality of an input layer, hidden layer or output layer of a neural network), or in a combination of program instructions and supporting circuitry for performing the functionality of a neural network.

In some embodiments, system memory 710 may include program instructions and data configured to implement various modules of a neural network, such as one or more input neurons, one or more hidden layer neurons (i.e. processing units), and/or one or more output neurons. In various embodiments, system memory 710 may store application code 715 and/or may include a data storage portion 717. System memory 710 may also include program instructions and data configured to implement operating system code 712, in some embodiments. Input layer 732 may in some embodiments include one or more input neurons configured to receive and/ or detect various performance related parameter values, performance related triggers, information about accesses made by an application, hardware or operating system parameter values, or other performance related information at runtime.

Note that application code 715, any code implementing neural network 730, and/or operating system code 712 may each be implemented in any of various programming languages or methods. For example, in one embodiment, application code 715, neural network 730, and operating system code 712 may be JAVA based, while in another embodiments, they may be written using the C or C++ programming languages. Moreover, in some embodiments, application code 715, neural network 730, and operating system code 712 may not be implemented using the same programming language. For example, application source code 715 may be C++ based, while neural network 730 may be developed using C.

In some embodiments, system memory 710 may include a data storage area 717. Data storage 717 may in some embodiments store hardware and/or operating system parameter values, data accessed or generated by application code 715, and/or action/reward values maintained by neural network 730 (e.g., when neural network 730 employs reinforcement learning or another self-training technique). In other embodiments, data storage area 717 may be partitioned into multiple data storage areas and/or may be distributed across multiple machines or computer systems. In one embodiment, one or more of these data storage areas may be located on a remote storage device, such as disk storage 750. In some embodiments, an L3 cache may be allocated from system memory 710 or data storage 717, which in other embodiments an L3 cache may be implemented as a separate block of memory (shown as 720).

Processor 770 may be configured to implement any of various instruction set architectures, such as x86, SPARC, PowerPC, etc. In some embodiments, processor 2370 may include a single CPU core, multiple CPU cores, or any combination of one or more general-purpose CPU cores and special-purpose cores (e.g., digital signal processors, hardware accelerators, co-processors, etc.) In various embodiments, processor 770 may be configured to implement a superscalar architecture or may be configured to implement multi-threading. In some embodiments, processor 770 may be a chip-multithreaded (CMT) processor.

As illustrated in FIG. 7 and noted above, processors 770 may include L1 and L2 caches In this example, a memory access request may be satisfied by fetching cached data from one or more local caches (e.g., L1 cache 772 or and L2 cache 775), from an L3 cache 720, from system memory 710, or from disk storage 750. When the data request is satisfied, the response may include an indication of whether the source of the data is local, rather than remote, and/or whether the source of the data is one of the caches in the system (e.g., an indication of an L1, L2, or L3 cache hit, or an indication of an L1, L2, or L3 cache miss).

Interconnect 790 may couple processor 770 to memory 710, as illustrated. In some embodiments, interconnect 790 and input/output interface 760 may be configured to implement one or more of various interface or network standards, e.g., Peripheral Component Interconnect (PCI), Ethernet, HyperTransport (HT), Infiniband, or any variant or successor of these or other suitable input/output protocols. In some embodiments, one or more hardware event counters (not shown) may be included in computer system 700 to collect performance related data during execution of application code 715.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
performing, by a computer:
beginning execution of an application on the computer, wherein said executing comprises temporarily storing in a cache data being accessed or computed by the application, wherein said temporarily storing stores the data in the cache according to a first caching algorithm; and
during said execution:
a neural network running on the same computer monitoring values of one or more performance related parameters that reflect or affect the application's access to data or storage of data computed by the application;
based on results of said monitoring, the neural network determining that the application's access to data or storage of data computed by the application is being rendered suboptimal by temporarily storing the data being accessed or computed by the application according to the first caching algorithm, such that the performance of the application itself is being rendered unacceptable or is being degraded;
the neural network, in response to said determining, selecting a second caching algorithm to be used when temporarily storing data being accessed or computed by the application in order to improve the performance of the application during said execution, wherein said selecting is dependent, at least in part, on results of said monitoring;
dynamically replacing the first caching algorithm with the second caching algorithm for the application to enable the computer to temporarily store in the cache, according to the second caching algorithm, data being accessed or computed by the application; and
continuing execution of the application, wherein said continuing execution comprises temporarily storing data being accessed or computed by the application in a cache according to the second caching algorithm in order to improve the performance of the application during said execution.

2. The method of claim 1, wherein the performance related parameters comprise one or more of: a cache hit rate, a data throughput rate, or a memory access request response time.

3. The method of claim 1, wherein each of the first and second caching algorithms comprises a different one of: a memcached algorithm, a memcacheDB algorithm, a least recently used algorithm, a most recently used algorithm, a least frequently used algorithm, a frequency based replacement algorithm, a least $k^{th}$-to-last reference algorithm, or a least frequently recently used algorithm.

4. The method of claim 1, wherein each of the first and second caching algorithms operates in conjunction with a different one of: a set-associative cache, a fully associative cache or a direct-mapped cache.

5. The method of claim 1, wherein said monitoring comprises determining whether a value of one or more of the one or more performance parameters meets or exceeds a pre-determined threshold value.

6. The method of claim 1, wherein said monitoring comprises detecting a pattern of memory accesses made by the application.

7. The method of claim 1, wherein said monitoring comprises detecting a change in a workload of the application, a change in a pattern of memory accesses made by the application, a change in a frequency of memory accesses made by the application, a change in a hardware component of the computer, or a change in a parameter of an operating system of the computer.

8. The method of claim 1, wherein said selecting comprises selecting a caching algorithm dependent on a weighting of the values of the one or more performance related parameters.

9. The method of claim 1, further comprising:
subsequent to said replacing and during said execution:
the neural network monitoring performance of the application; and
in response to determining that said replacing did not result in improved performance of the application during said execution, the neural network selecting a third caching algorithm to be used when temporarily storing data accessed by the application.

10. The method of claim 1, further comprising:
prior to said beginning execution, the neural network selecting the first caching algorithm, wherein said selecting is dependent on a predicted pattern of memory accesses to be made by the application, a predicted value of a hardware or operating system parameter, or a predicted value of a performance related parameter.

11. A computer system, comprising:
one or more processors;
a memory coupled to the one or more processors and storing program instructions executable by the one or more processors to implement an application; and
a neural network running on the computer system;
wherein during execution of the application on the same computer system, the neural network is configured to:
repeatedly monitor values of one or more performance related parameters that reflect or affect the application's access to data or storage of data computed by the application;
dynamically detect a new condition affecting the execution of the application such that temporarily storing data accessed or computed by the application according to a current caching algorithm causes suboptimal performance of the application while the newly-detected condition is in effect;
dynamically select another caching algorithm different from the current caching algorithm to be used when temporarily storing data accessed or computed by the application while the newly-detected condition is in effect, wherein the other caching algorithm provides more optimal performance of the application than the current caching algorithm does while the newly-detected condition is in effect, and wherein said selecting is dependent, at least in part, on results of said monitoring; and
cause the selected other caching algorithm to be applied when temporarily storing data accessed or computed by the application while the newly-detected condition is in effect in order to improve the performance of the application during said execution of the application.

12. The computer system of claim 11, wherein the performance related parameters comprise one or more of: a cache hit rate, a data throughput rate, or a memory access request response time.

13. The computer system of claim 11, wherein said monitoring comprises determining whether a value of one or more of the one or more performance parameters meets or exceeds a pre-determined threshold value.

14. The computer system of claim 11, wherein said monitoring comprises detecting a pattern of memory accesses made by the application, a change in a workload of the application, a change in a pattern of memory accesses made by the application, a change in a frequency of memory accesses made by the application, a change in a hardware component of the computer system, or a change in a parameter of an operating system of the computer system.

15. The computer system of claim 11, wherein said dynamically selecting comprises dynamically selecting the other caching algorithm dependent on a weighting of the values of the one or more performance related parameters.

16. A non-transitory, computer-readable storage medium, storing program instructions that when executed on a computer system cause the computer system to:
during execution of an application on the same computer system:
repeatedly monitor values of one or more performance related parameters that reflect or affect the application's access to data or storage of data computed by the application;
dynamically detect a new condition affecting the execution of the application such that temporarily storing data accessed or computed by the application according to a current caching algorithm causes suboptimal performance of the application while the newly-detected condition is in effect;
dynamically select another caching algorithm different from the current caching algorithm to be used when temporarily storing data accessed or computed by the application while the newly-detected condition is in effect, wherein the other caching algorithm provides more optimal performance of the application than the current caching algorithm does while the newly-detected condition is in effect, and wherein said selecting is dependent, at least in part, on results of said monitoring; and
cause the selected other caching algorithm to be applied when temporarily storing data accessed or computed by the application while the newly-detected condition is in effect in order to improve the performance of the application during said execution of the application.

17. The storage medium of claim 15, wherein the performance related parameters comprise one or more of: a cache hit rate, a data throughput rate, or a memory access request response time.

18. The storage medium of claim 15, wherein said monitoring comprises determining whether a value of one or more of the one or more performance parameters meets or exceeds a pre-determined threshold value.

19. The storage medium of claim 15, wherein said monitoring comprises detecting a pattern of memory accesses made by the application, a change in a workload of the application, a change in a pattern of memory accesses made by the application, a change in a frequency of memory accesses made by the application, a change in a hardware component of the computer system, or a change in a parameter of an operating system of the computer system.

20. The storage medium of claim 15, wherein said dynamically selecting comprises dynamically selecting the other caching algorithm dependent on a weighting of the values of the one or more performance related parameters.

\* \* \* \* \*

UNITED STATES PATENT AND TRADEMARK OFFICE
CERTIFICATE OF CORRECTION

Page 1 of 1

PATENT NO. : 8,965,819 B2
APPLICATION NO. : 12/857339
DATED : February 24, 2015
INVENTOR(S) : Tirunagari It is certified that error appears in the above-identified patent and that said Letters Patent is hereby corrected as shown below:

On the title page, item 56 column 2, under Other Publications, line 7, delete "Micropgramming," and insert -- Microprogramming, --, therefor.

In the specification

In column 6, line 17, delete "stablized." and insert -- stabilized. --, therefor.

In column 17, line 46, delete "or and" and insert -- and --, therefor.

Signed and Sealed this
Twentieth Day of October, 2015

Michelle K. Lee
*Director of the United States Patent and Trademark Office*